John J. Heigl
Victor F. Massa
James A. Wilson
  Inventors
By W. O. T. Keilman
  Patent Attorney John J. Heigl
Victor F. Massa   Inventors
James A. Wilson
By W. O. ⟨signature⟩ Patent Attorney John J. Heigl
Victor F. Massa      Inventors
James A. Wilson By W. O. 7 Feilman  Patent Attorney United States Patent Office 3,126,733
Patented Mar. 31, 1964

3,126,733
FUEL COMBUSTION CHARACTERISTIC
INDICATOR
John J. Heigl, Short Hills, Victor F. Massa, Berkeley Heights, and James A. Wilson, Stanhope, N.J., assignors to Esso Research and Engineering Company, a corporation of Delaware
Filed Oct. 30, 1961, Ser. No. 149,155
4 Claims. (Cl. 73—35)

This invention relates to an apparatus for instantaneously timing the occurrence of peak cylinder pressure or arrival of a combustion flame at an ion gap in terms of rotational degrees of an internal combustion engine. In particular, this invention relates to an electronic apparatus whereby the rotational degrees of an internal combustion engine are counted between the time of arrival of the combustion flame at an ion gap, or the time of occurrence of peak cylinder pressure, and a predetermined rotational angle of the engine. The count so obtained represents the time of arrival of the combustion flame at an ion gap, or the occurrence of the peak cylinder pressure, in terms of the rotational angle of the internal combustion engine.

The present application is a continuation-in-part of copending application Serial No. 61,300 filed in the United States Patent Office on October 7, 1960.

As a result of the high compression ratios currently used in internal combustion engines, the pressures and temperatures attained in engine cylinders have caused abnormal combustion known as surface ignition. The abnormal combustion resulting from surface ignition results in an audible rumble within the engine cylinder. To alleviate the rumble caused by surface ignition, fuels must be tested to ascertain their surface ignition tendencies. The inherent combustion properties of fuels play an important role in the surface ignition tendencies of a given fuel.

Thus, it is an object of the present invention to provide an apparatus to aid in the evaluation of the surface ignition phenomenon. By using the present invention, the abnormal combustion causing engine rumble may be evaluated.

The present invention, employing an ion gap in a cylinder, is used to determine the speed of flame travel with various fuels. For instance, the speed of flame travel with benzene was found to be about 14 percent faster than with iso-octane. In the case of an engine developing peak pressures critically close to those required to produce rumble, the difference in flame speed between these two fuels would be sufficient to cause rumble with benzene and not with iso-octane.

The present invention is also used to determine the time of the occurrence of peak cylinder pressures causing engine rumble. It may further be used to evaluate the combustion properties of fuels in an internal combustion engine.

The nature and substance of this invention will be more clearly perceived and fully understood by referring to the following description and claims taken in connection with the accompanying drawings in which:

Figure 1:
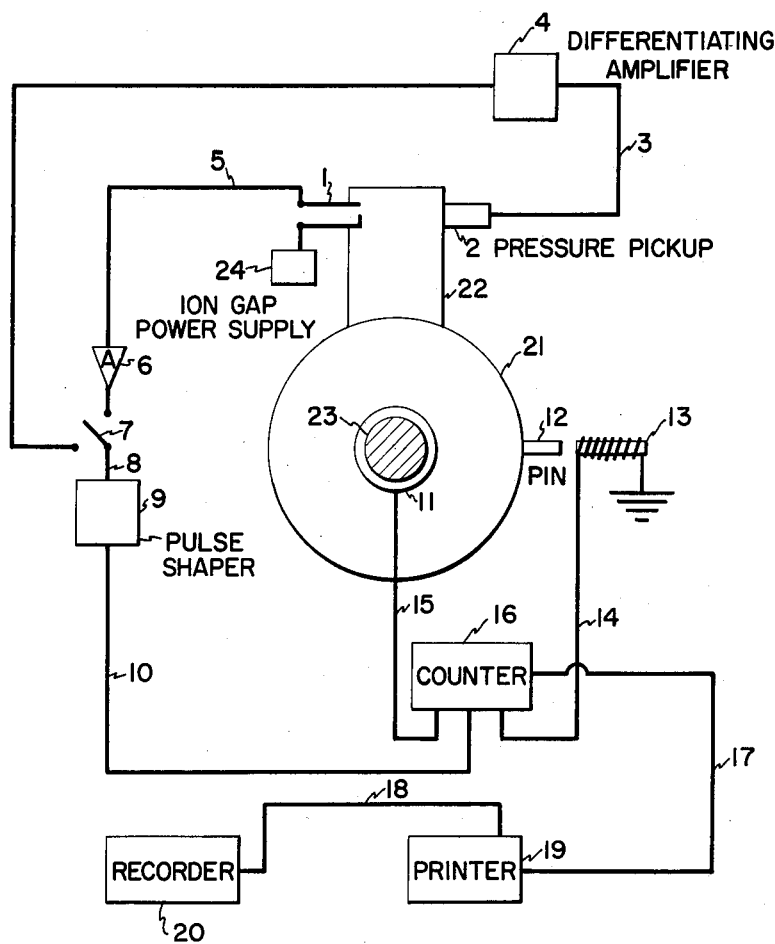
FIG. 1 represents a diagrammatic view of the present invention as applied to a single cylinder internal combustion engine.

Referring now to the drawings in detail, especially FIG. 1 thereof, either ion gap 1 or pressure pickup 2 may be connected into the circuit of this invention by means of switch 7. For present purposes, the invention will be described with ion gap 1 in its circuit.

Ion gap power supply 24 imposes a direct voltage on ion gap 1. This voltage has a potential of about 100 volts. Ion gap 1 is positioned in engine cylinder 22. When the combustion flame reaches the ion gap, the ions in the flame act to conduct an electric current on account of the voltage imposed on the ion gap. An electric signal is then transmitted through conductor 5 and amplified to a level in amplifier 6 sufficient to actuate pulse shaper 9.

The electric signal received by pulse shaper 9 is not a sharp signal, but is a signal which gradually increases in intensity to a maximum and then decreases as the flame passes ion gap 1.

Therefore, the function of pulse shaper 9 is to take an erratic, ill-defined electric signal from ion gap 1 and transmit a sharp, clearly-defined electric signal through conductor 10 to counter 16. Pulse shaper 9 is preset to fire a sharp signal when the signal from ion gap 1 reaches a given intensity.

Pulse generator 11 generates an electric impulse for each degree of rotation of crankshaft 23. Other suitable units of rotational displacement can be used. However, it is preferred to use the basic circular degree in order that the arrival of the flame at ion gap 1 can be directly timed with respect to the rotational displacement of crankshaft 23 in degrees.

Pulse generator 11 is driven by the engine. The pulse generator may be coupled directly to crankshaft 23 by any suitable means, or it may be belt-driven from the crankshaft. However, it is not necessary that pulse generator 11 be either coupled directly to or belt-driven from crankshaft 23. Any cyclically moving part in synchronism with the crankshaft may be used to drive pulse generator 11.

Counter 16 counts the electric impulses received from pulse generator 11 through conductor 15. Thus, when counter 16 receives the electric signal from pulse shaper 9 through conductor 10, it commences to count the electric impulses from pulse generator 11 received through conductor 15. In this manner, the arrival of the flame at ion gap 1 is used to actuate counter 16 to count the rotational degrees of crankshaft 23.

Pin 12, which is made of a paramagnetic material, is secured to flywheel 21 or any rotational body in synchronism with it by any suitable means. For instance, it may be bolted to flywheel 21.

Magnetic pickup 13 consists of a permanently magnetized rod around which is wrapped a coil of metal wire. This pickup is mounted on a stationary part of the engine or other suitable object that does not rotate with the cyclically moving parts of the engine.

Locationwise, magnetic pickup 13 is in a fixed position at close proximity to the path of travel of pin 12 so that when this pin passes the pickup an electric current is induced in the coil thereof, and a current is transmitted through conductor 14 to counter 16. This current acts to make the counter unresponsive to the electric impulses from pulse generator 11.

Since the location of magnetic pickup 13 and pin 12 may be varied, the point in time at which pin 12 passes magnetic pickup 13 may be set to occur at any desired rotational position of crankshaft 23. Thus, counter 16 is made unresponsive to the electric impulses from pulse generator 11 at a predetermined crank angle.

Counter 16 counts the degrees of rotation of crankshaft 23 between the arrival of the flame at ion gap 1 and a predetermined crank angle. In this manner, the arrival of the flame at ion gap 1 is timed with respect to rotation of crankshaft 23.

As pointed out previously, the arrival of the flame at ion gap 1 causes counter 16 to become responsive to the electric impulses from pulse generator 11. The current induced in magnetic pickup 13 then causes counter 16 to become unresponsive to those electric impulses. These functions may, however, be reversed. That is, the current induced in magnetic pickup 13 can cause counter 16 to become responsive to the electric impulses from pulse generator 11, while the arrival of the flame at ion gap 1 causes it to become unresponsive to those same electric impulses.

Nevertheless, it is preferred to use the circuit as illustrated and described in order that the positively acting element, magnetic pickup 13, causes counter 16 to become unresponsive, while the questionable element, ion gap 1, causes counter 16 to become responsive. With counter 16 being operated in this way, the data obtained are more reliable.

A record of the data generated by counter 16 is obtained by transmitting the information from the counter to printer 9 through conductor 17. Recorder 20 receives the information from printer 19 through conductor 18. In this general connection, some further explanation of the operation of counter 16 both internally and in connection with printer 19 is considered to be useful and desirable.

Counter 16 is a standard electronic register for counting electrical input pulses. Such pulses are available from pulse generator 11 at all times that crankshaft 23 is turning. The counter has a pulse operated switching circuit to start the counting cycle. "On" pulses are received by counter 16 from pulse shaper 9, itself receiving input signals from either ion gap 1 or pressure pickup 2, through conductor 10. Additionally, counter 16 has a pulse operated switching circuit to stop the counting cycle. "Off" pulses are generated by magnetic pickup 13 when pin 12 in flywheel 23 passes through the field of the pickup. Conductor 17 carries register information from the counter to printer 19. At the end of the counting operation, a "Print Command" signal is conveyed to the printer through this same conductor. After the printing operation, conductor 17 carries a reset signal back to counter 16 for resetting the complete system so that a new count may be started from zero. This happens at or just before the time the counter is made responsive to signals from pulse generator 11.

When switch 7 is connected with conductor 3, pressure pickup 2 is in the circuit in place of ion gap 1. The pressure pickup is a quartz crystal which generates an electric current upon being compressed. It is coupled directly with cylinder 22 so that as pressure in the cylinder increases the electric signal from the pressure pickup increases also.

Upon being generated, the electric signal from pressure pickup 2 passes through conductor 3 to differentiating amplifier 4. The purpose of this amplifier is to pass on to pulse shaper 9 the derivative of the signal which it receives from the pressure pickup. By using the derivative of this signal, pulse shaper 9 may be made to emit its sharp electric signal to counter 16 at the instant the peak pressure is reached in cylinder 22. The signal from the pulse shaper to counter 16 causes the counter to become responsive to the electrical impulses emitted by pulse generator 11 as noted hereinbefore. The description of the remaining circuit is substantially the same as previously set forth, and need not be repeated.

The equipment of all circuits so far described is conventional, and, for the most part, is available commercially. For instance, pressure pickup 2 can be a Kissler pressure pickup. Differentiating amplifier 4 can also be a Kissler model. Pulse shaper 9 is a Schmidt Trigger. Counter 16 can be a Hewlett Packard 522 counter. Printer 19 can be a Hewlett Packard 560 printer, and recorder 20 can be a Bristol Strip Chart Recorder. Numerous pulse generators emitting electrical impulses at predetermined intervals are available. Pin 12 and magnetic pickup 13 are also conventional equipment.

Figure 2:
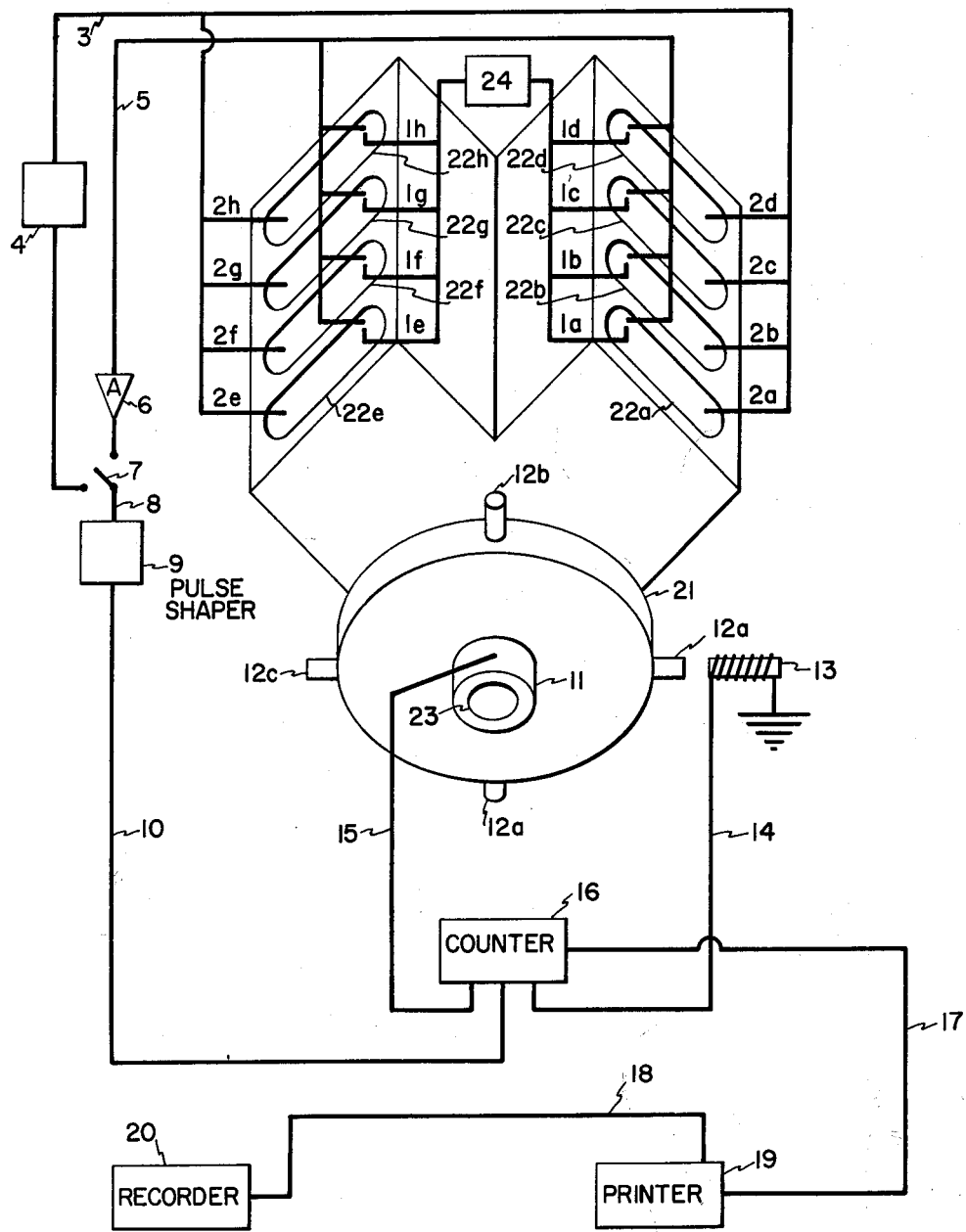
FIG. 2 represents a diagrammatic view of the present invention as applied to an eight cylinder internal combustion engine.

Referring next to FIG. 2, there is shown the present invention applied to an eight cylinder internal combustion engine. Ion gaps 1a to 1h are located in each of the eight cylinders 22a to 22h as are pressure pickups 2a to 2h. The only difference in operation of the present invention as applied to the eight cylinder engine in FIG. 2 as contrasted to the single cylinder setup in FIG. 1 lies in pins 12a to 12d.

During each revolution of flywheel 21, four of the eight cylinders fire. Said in other words, peak pressure and the flame of combustion will occur in four of the eight cylinders during one revolution of the flywheel. For this reason, pins 12a, 12b, 13c, and 12d are spaced along flywheel 21 at 90° intervals. Pins 12a to 12d are so located that peak pressure is achieved and also the combustion flame arrives at the ion gap in one of the cylinders 22a to 22h before one of the pins 12a to 12d passes magnetic pickup 13. The resulting electrical impulse from the magnetic pickup is used to make counter 16 unresponsive to the electrical impulses from pulse generator 11.

Similarly the electrical impulse from each ion gap 1a to 1h or from each pressure pickup 2a to 2h is used with the aid of pulse shaper 9 to make counter 16 responsive to the electrical impulses from pulse generator 11. In this manner, counter 16 is made responsive to the electrical impulses from pulse generator 11 eight times during every two revolutions of flywheel 21, and is also made unresponsive eight times during every two revolutions of the flywheel.

As pointed out hereinbefore, the electric impulse from magnetic pickup 13 can be used to make counter 16 responsive to the electrical impulses from pulse shaper 11, and the signal from pulse shaper 9 can be used to make counter 16 unresponsive to the electrical impulses from the pulse generator. However, the arrangement previously described is preferred.

Figure 3:
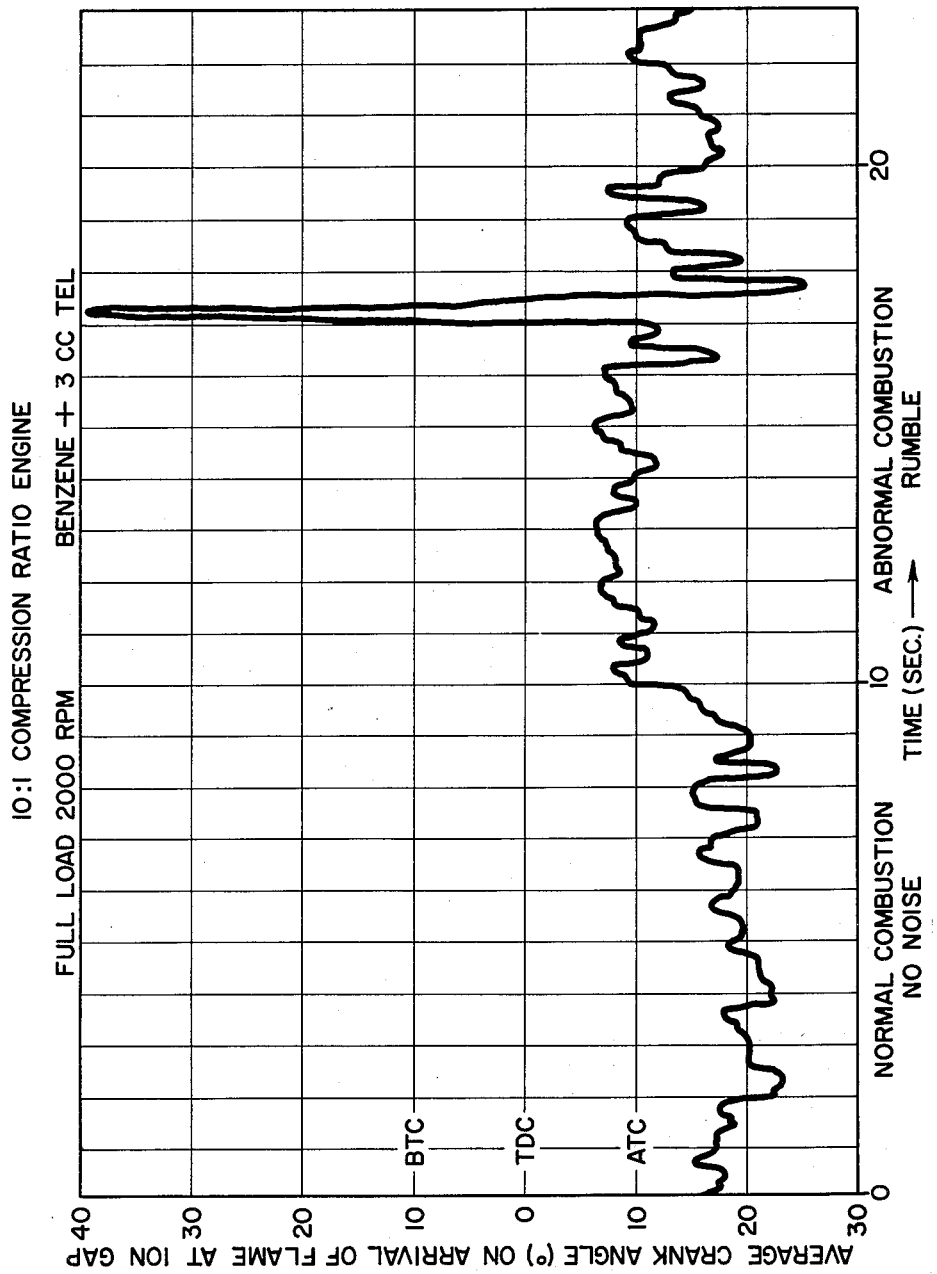
FIG. 3 represents a graphical record of the data obtained from an eight cylinder internal combustion engine with the present invention.

Referring finally to FIG. 3, there is shown a graphical record of the data obtained by an instrument combination according to the present invention during a test run on an eight-cylinder engine, these data representing an average of all eight cylinders. The engine had a compression ratio of 10:1, and was operated under a full load at 2000 revolutions per minute on a fuel comprising benzene containing 3 cubic centimeters of tetraethyl lead per gallon.

The graph of FIG. 3 is a plot of the average time of arrival of the flame at the ion gap expressed in degrees of rotation of the crankshaft (CA°) or piston displacement from top dead center (TDC) indicated as zero against the time from the start of the test in seconds. As will be seen from the graph, normal running with the flame reaching the ion gap about 20° after top dead center (ATC) occurred for about the first ten seconds of the test. During this time no undue noise was produced. After about ten seconds of engine operation, the time of flame arrival at the ion gap advanced to about 10° after top dead center when abnormal running and rumble occurred. In the later course of the particular test of which the data are plotted, at about 17 seconds after the starting of the test, a very sudden and short phenomenon occurred when the flame reached the ion gap at about 40° before top dead center (BTC). It is believed that this was caused by early surface ignition from the heated deposits resulting from the high level load employed.

It is intended to secure protection by Letters Patent of the foregoing-described invention in all its aspects to the broadest extent that the prior art allows.

What is claimed is:

1. An apparatus for timing the occurrence of peak pressure in a cylinder of an internal combustion engine, said apparatus comprising (1) a pressure pickup in a cylinder of said engine, said pressure pickup generating an electric current representing the pressure in said cylinder, (2)

a pulse shaper adapted to emit a sharp electrical signal at the occurrence of peak pressure in said cylinder, (3) electrical conductor means connecting said pressure pickup with said pulse shaper, (4) an electronic pulse generator driven by said engine and emitting a succession of electrical impulses related to the revolutions of said engine, (5) an electronic counter responsive to said electrical impulses of said pulse generator upon being actuated by said sharp electrical signal from said pulse shaper, (6) electrical conductor means connecting said pulse shaper with said electronic counter, (7) electrical conductor means connecting said electronic pulse generator with said electronic counter, (8) a paramagnetic armature pin secured to a part of said engine moving cyclically in synchronism with the crankshaft, (9) a magnetic pickup disposed to be bypassed by said armature pin at a predetermined crank angle in the course of operation of said engine and have an electric current induced in it, said induced current being capable of actuating said counter to be unresponsive to said electrical impulses from said pulse generator, and (10) electrical conductor means connecting said magnetic pickup with said electronic counter.

2. An apparatus for timing the occurrence of peak pressure in a cylinder of an internal combustion engine, said apparatus comprising (1) a first electronic means installed in said cylinder which emits a signal representing the pressure in said cylinder, (2) a second electronic means installed in connection with the crankshaft of said engine which emits a succession of electrical impulses related to revolutions of said engine, (3) a third electronic means adapted to count the electrical impulses from said second electronic means, (4) electrical conductor means connecting said second and third electronic means, (5) a fourth electronic means adapted to receive the electric signal from said first electronic means and generate an electric signal at the occurrence of peak pressure in said cylinder to actuate said third electronic means to be responsive to the electrical impulses from said second electronic means, (6) electrical conductor means connecting said first and fourth electronic means, (7) electrical conductor means connecting said third and fourth electronic means, (8) a fifth electronic means adapted to actuate said third electronic means to be unresponsive to the electrical impulses from said second electronic means at a predetermined crank angle of said engine, and (9) electrical conductor means connecting said third and fifth electronic means.

3. An apparatus for timing the arrival of a combustion flame at an ion gap in a cylinder of an internal combustion engine, said apparatus comprising (1) an ion gap located in a cylinder of said engine, said ion gap being adapted upon application of an electrical potential thereto to conduct an electric current in the presence of a flame, (2) a direct electrical potential source, (3) electrical conductor means connecting said ion gap with said potential source, (4) a pulse shaper adapted to emit a sharp electrical signal upon actuation by current from said ion gap, (5) electrical conductor means connecting said ion gap with said pulse shaper, (6) an electronic pulse generator driven by said engine and emitting a succession of electrical impulses related to the revolutions of said engine, (7) an electronic counter responsive to said electrical impulses of said pulse generator upon being actuated by said sharp electrical signal from said pulse shaper, (8) electrical conductor means connecting said pulse shaper with said electronic counter, (9) electrical conductor means connecting said electronic pulse generator with said electronic counter, (10) a paramagnetic armature pin secured to a part of said engine moving cyclically in synchronism with the crankshaft, (11) a magnetic pickup disposed to be bypassed by said armature pin at a predetermined crank angle in the course of operation of said engine and have an electric current induced in it, said induced current being capable of actuating said counter to be unresponsive to said electrical impulses from said pulse generator, and (12) electrical conductor means connecting said magnetic pickup with said electronic counter.

4. An apparatus for timing the arrival of a combustion flame at an ion gap in a cylinder of an internal combustion engine, said apparatus comprising (1) a first electronic means installed in said cylinder which conducts an electric current in the presence of a flame, (2) a second electronic means installed in connection with the crankshaft of said engine which emits a succession of electrical impulses related to the revolutions of said engine, (3) a third electronic means adapted to count the electrical impulses from said second electronic means, (4) electrical conductor means connecting said second and third electronic means, (5) a fourth electronic means adapted to receive the electric current from said first electronic means and generate an electric signal when said first electronic means conducts a current to actuate said third electronic means to be responsive to the electrical impulses from said second electronic means, (6) electrical conductor means connecting said first and fourth electronic means, (7) electrical conductor means connecting said third and fourth electronic means, (8) a fifth electronic means adapted to actuate said third electronic means to be unresponsive to the electrical impulses from said second electronic means at a predetermined crank angle of said engine, and (9) electrical conductor means connecting said third and fifth electronic means.

References Cited in the file of this patent

UNITED STATES PATENTS

| | | |
|---|---|---|
| 2,888,822 | Burhans | June 2, 1959 |
| 2,973,638 | Fluegel | Mar. 7, 1961 |
| 3,010,313 | Weller | Nov. 28, 1961 |